United States Patent
Quertelet

(10) Patent No.: US 6,570,092 B2
(45) Date of Patent: May 27, 2003

(54) HIGH-STRENGTH WIRE CABLE DUCT

(75) Inventor: Stéphane Quertelet, Remy (FR)

(73) Assignee: Krieg & Zivy Industries, Chevrieres (FR)

( * ) Notice: Subject to any disclaimer, the term of this patent is extended or adjusted under 35 U.S.C. 154(b) by 0 days.

(21) Appl. No.: 09/767,148

(22) Filed: Jan. 23, 2001

(65) Prior Publication Data

US 2001/0009192 A1 Jul. 26, 2001

(30) Foreign Application Priority Data

Jan. 24, 2000 (FR) .............................. 00 00852

(51) Int. Cl.⁷ ................................. H02G 3/00
(52) U.S. Cl. .................... 174/68.3; 52/220.1; 52/220.2; 248/49
(58) Field of Search ............... 174/68.3, 68.1, 174/69, 72 A, 99 R; 52/220.1, 220.2, 220.6, 220.7; 248/49

(56) References Cited

U.S. PATENT DOCUMENTS

| | | | |
|---|---|---|---|
| 2,199,152 A | 4/1940 | Edge ........................... 29/155 |
| 5,531,410 A | * 7/1996 | Simon .......................... 248/49 |
| 5,927,658 A | * 7/1999 | Gerster ......................... 248/49 |
| 6,023,024 A | * 2/2000 | Stjerneby ..................... 174/95 |
| 6,138,961 A | * 10/2000 | Zweig ........................ 248/68.1 |
| 6,193,434 B1 | * 2/2001 | Durin et al. ................. 403/329 |

FOREIGN PATENT DOCUMENTS

FR    2 706 973    12/1994

* cited by examiner

Primary Examiner—Dean A. Reichard
Assistant Examiner—W. David Walkenhorst
(74) Attorney, Agent, or Firm—Young & Thompson

(57) ABSTRACT

A wire cable duct includes a grid made up of wires of two different types, namely longitudinal wires which run longitudinally the entire length of the duct and U-shaped transverse wires disposed transversely to the longitudinal wires, from place to place along their length and appropriately attached thereto. The resulting trough-like combination forms three panels, namely a bottom panel and two side panels. The side panels include a longitudinal row of successive planar and substantially rectangular edge meshes which constitute upper parts of the side panels, each of which is defined between two facing flange portions of two consecutive transverse wires, and each of which includes at least one anti-flexing member to limit its flexing about an axis perpendicular to its plane.

1 Claim, 2 Drawing Sheets

HIGH-STRENGTH WIRE CABLE DUCT

BACKGROUND OF THE INVENTION

1. Field of the Invention

The present invention relates generally to wire cable ducts.

2. Description of the Prior Art

Prior art wire cable ducts take the form of a grid made up of wires of two different types, namely longitudinal wires, usually referred to as warp wires, which run longitudinally the entire length of the duct in a rectilinear or quasi-rectilinear manner and, disposed transversely to the longitudinal wires, from place to place along their length and appropriately attached thereto, U-shaped transverse wires, usually referred to as weft wires, the combination forming three panels which in practice are planar or substantially planar, namely a bottom panel and two side panels, usually referred to as flanges.

They are routinely used as troughs to support, house and protect electrical cables or the like.

Here and hereinafter the expression "electrical cables" refers not only to cables adapted to convey and distribute electrical energy but also to cables and fibers adapted to transmit information in electrical, optical or other form.

With regard to electrical cables, wire cable ducts have many advantages which are appreciated by electrical installers and in particular the advantages of easy installation, and therefore economy, flexibility, because the electrical cables can exit through any mesh of the grid, transparency, and therefore of easy identification of the electrical cables, ventilation, cleanliness, safety, both with regard to the electrical cables themselves and users, and performance.

By virtue of their very design, the maximum span of the above wire cable ducts is limited, as are the loads they are able to support: for this reason the inherent capacity of the trough shape is not completely utilized, unless the number of supports and jointing members is increased, which is to the detriment of assembly time and therefore to installation cost; also, the installation environment often rules out the fitting of numerous supports.

The side panels comprise a longitudinal row of successive substantially rectangular and plane edge meshes which constitute the upper part of the side panels and each of which is defined between the facing flange portions of two consecutive U-shaped transverse wires and between two longitudinal wires which cross over them. They sag to a non-negligible degree when heavily loaded.

An object of the present invention is to avoid the above drawbacks and to propose a wire cable duct with a longer span or higher loading capacity than prior art wire cable ducts; thus the present invention provides a high-strength cable duct.

The document FR-A-2 706 973 describes a cable duct of the above kind which is made stronger by fixing reinforcing lateral spars to the side walls of a wire trough which overlie the side walls completely.

SUMMARY OF THE INVENTION

Numerous trials carried out by the inventors of the present invention have shown that, in order to increase the stiffness of a meshed cable duct, it is sufficient to limit flexing of only the edge meshes, which is a simpler and less costly solution than that disclosed by the above prior art document.

Accordingly, the invention provides a wire cable duct comprising a grid made up of wires of two different types, namely at least one longitudinal wire which runs longitudinally the entire length of the duct and U-shaped transverse wires disposed transversely to the longitudinal wires, from place to place along their length and appropriately attached thereto, the resulting trough-like combination forming three panels, namely a bottom panel and two side panels, which side panels comprise a longitudinal row of successive plane and substantially rectangular edge meshes which constitute upper parts of the side panels, each of which is defined between two facing flange portions of two consecutive transverse wires, and each of which includes at least one anti-flexing member adapted to limit its flexing about an axis perpendicular to its plane.

In a first embodiment each edge mesh consists of two longitudinal wires joined to facing flange portions of two transverse wires and to each other by at least one cross-member. The crossmember is parallel to the flange portions of the transverse wires. Alternatively, the crossmember is inclined to the flange portions of the transverse wires. In another embodiment the crossmember has an open U-shape with a core attached to one longitudinal wire and arms attached at their ends to the other longitudinal wire. The ends of the arms are preferably also joined to the flange portions of the transverse wires at the intersection thereof with the other longitudinal wire. The core of the open U-shape is advantageously attached to an upper longitudinal edge wire. The crossmember is preferably a continuous wire which is adapted to limit flexing of consecutive meshes and is alternately connected to each of the longitudinal wires delimiting the meshes.

In another embodiment each edge mesh consists of a section attached to the flange portions of the transverse wires. The section is plane and attached to the outside and/or to the inside of the cable duct. Alternatively, the section has an L-shaped cross section defining a longitudinal rim. The section is attached to the outside or to the inside of the cable duct with its longitudinal rim overlying free ends of the flange portions of the transverse wires. The section is attached to the outside of the cable duct with its longitudinal rim directed outward. Thus in these embodiments the edge mesh does not include any longitudinal wires.

In another embodiment the section has a U-shaped cross section with wide flanges and straddles the flange portions of the transverse wires.

In another embodiment the section has a U-shaped cross section with narrow flanges and is attached to the outside of the cable duct with its flanges directed outward. The narrow flanges are straight or have a rolled edge.

The features and advantages of the invention will emerge further from the following description, which is given by way of example and with reference to the accompanying diagrammatic drawings.

DETAILED DESCRIPTION OF THE PREFERRED EMBODIMENTS

Figure 1:
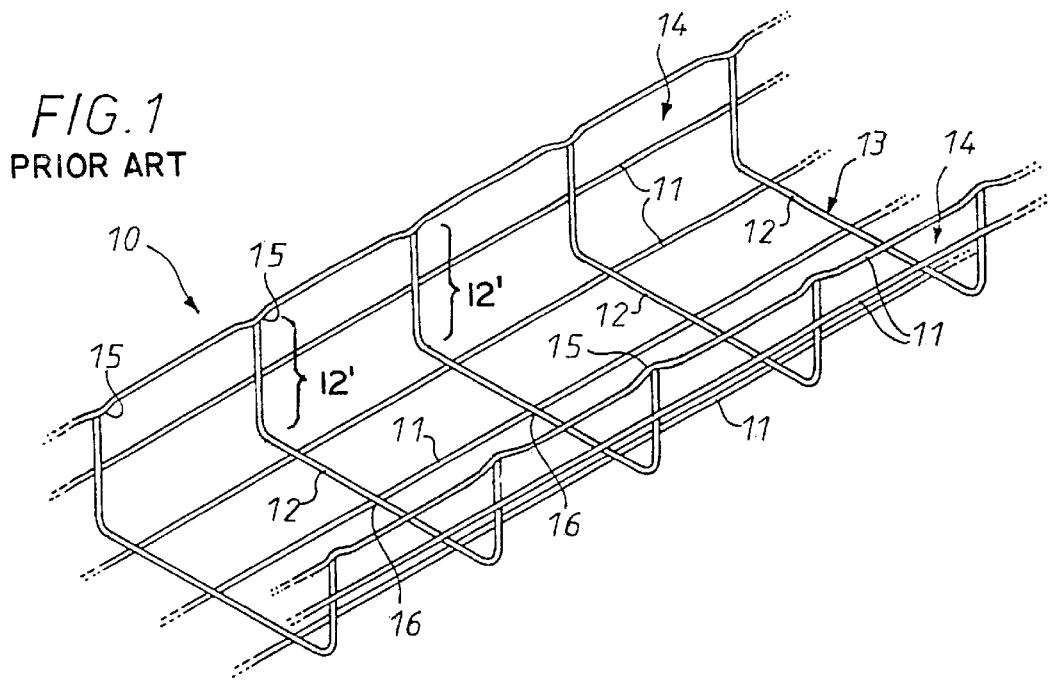
FIG. 1 is a perspective view of a prior art wire cable duct.

The wire cable duct 10 shown in FIG. 1 takes the form of a grid made up of wires 11, 12 of two different types, namely rectilinear or substantially rectilinear longitudinal wires 11 which run its entire length and U-shaped transverse wires 12 at regular intervals along and appropriately fixed to the longitudinal wires 11. This is known in the art. The resulting trough-like assembly comprises three panels, namely a bottom panel 13 and two side panels 14.

In practice the wires 11, 12 are metal wires and more precisely steel wires and are welded together at their crossing points 16.

By construction, the wires 11, 12 cross at different levels.

In practice the longitudinal wires 11 are at a lower level and are referred to as the lower wires and the transverse wires 12 are at an upper level and are referred to as the upper wires.

In other words, the longitudinal wires 11 extend along the outside of the transverse wires 12, but a different construction could of course be used, with the transverse wires 12 on the outside of the longitudinal wires 11.

In the embodiment shown, all the wires 11, 12 are round wires. In other words, they all have a circular cross section. Other shape cross sections are possible, however: square, rectangular, round with flats, polygonal or other shapes. The concept of diameter in the context of this application encompasses that of the width or thickness of the wire, depending on the shape of its cross section.

As shown here, for example, the diameter of the wire is the same for all the wires, but this is not necessarily always the case.

In the embodiment shown, the bottom panel 13 includes three longitudinal wires 11 and the longitudinal wires 11 and the corresponding transverse wires 12 define one mesh in each pitch.

However, the number of longitudinal wires 11 constituting the bottom panel 13, and therefore the number of meshes that they define in each pitch, can be different. In particular, in a variant that is not shown the bottom panel 13 includes only one longitudinal wire 11.

In the embodiment shown, each of the side panels 14 includes only two longitudinal wires 11, namely an intermediate longitudinal wire 11 substantially halfway up and an edge longitudinal wire 11. However, the number of longitudinal wires 11 can be different.

In particular, like the bottom panel 13, the side panels 14 can define meshes which can be the same size as the meshes of the bottom panel 13 or a different size.

In the embodiment shown, the edge longitudinal wire 11 of the side panels 14 includes undulations 15 which are spaced by the pitch of the duct and abut against the transverse wires 12, but this is not necessarily always the case.

Thus here the side panels 14 have along their upper edge a longitudinal row of successive meshes which are referred to as edge meshes, which are substantially rectangular and planar, and each of which is defined between the facing flange portions 12' of two consecutive U-shaped transverse wires 12 and between two longitudinal wires 11 that cross over said flange portions 12'.

Figure 2:
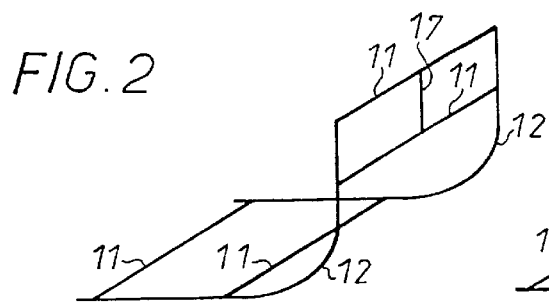
FIG. 2 is a partial view of a wire cable duct according to the invention.

In accordance with the invention, and as shown in FIG. 2, at least one of the edge meshes is stiffened to limit its flexing about an axis perpendicular to its plane, as a result of which the maximum span of the wire cable duct can be increased.

A rigid edge mesh of the above kind therefore includes an anti-flexing member consisting in this embodiment of a wire crossmember 17 linking the two longitudinal wires 11 defining the mesh, to which it is welded in this example.

Figure 3:
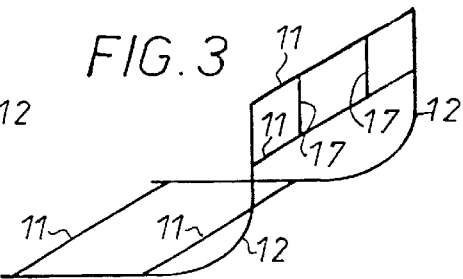
FIGS. 3 and 4 are analogous to FIG. 2 and each corresponds to one variant thereof.

In the FIG. 2 example there is a single crossmember 17 disposed parallel to the flange portions of the transverse wires 12, practically in the middle of the mesh. Several crossmembers like the crossmember 17 can be provided, of course. FIG. 3 shows a rigid edge mesh having two such crossmembers, for example.

A variant that is not shown includes one or more wire crossmembers inclined to the flange portions of the transverse wires 12.

Figure 4:
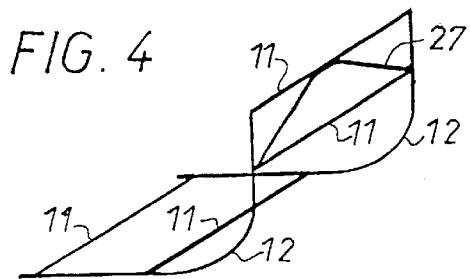

FIG. 4 shows an anti-flexing member consisting of an open U-shaped wire crossmember 27 whose core is welded to the top longitudinal wire 11 of the mesh in this example. The end of each arm of the U-shape is connected to the other longitudinal wire 11, or preferably, as shown here, to the intersection of the longitudinal wire 11 and the flange portions of the transverse wires 12.

In a variant that is not shown a crossmember like the crossmember 27 is part of a continuous wire joined alternately to the longitudinal wires 11 common to the successive meshes on respective opposite sides of the mesh shown in the figure. The continuous wire can of course be conformed to various shapes: trapezoidal, sinusoidal, broken line, etc.

In the variants shown in FIGS. 5 to 13 the anti-flexing member is in the form of a section, for example a metal section, which itself constitutes the rigid edge mesh, as it were; in the examples shown, the sections are sheet metal sections and are welded to the flange portions of the transverse wires 12. The sheet metal can be perforated or solid. As can be seen in FIGS. 5 to 13, the mesh then has no longitudinal wires.

Figure 5:
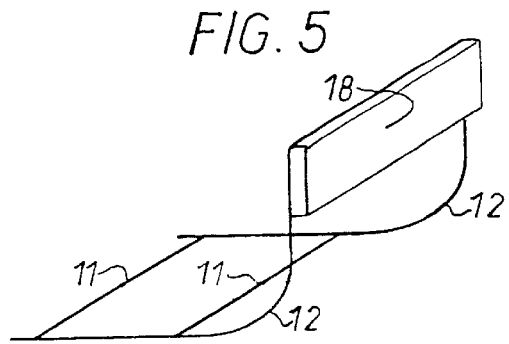
FIGS. 5 and 6 show part of another embodiment of a wire cable duct according to the invention and FIG. 6 is a view in cross section relative to FIG. 5.
Figure 6:
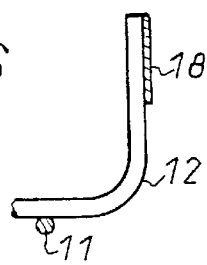
Figure 10:
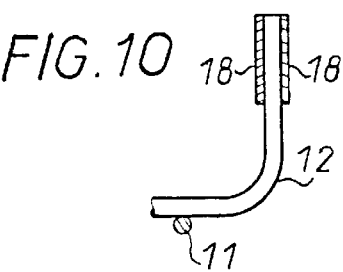

In FIGS. 5 and 6 the section 18 is plane and attached to the outside of the cable duct. It can instead be inside the duct. In FIG. 10, two such sections 18 are provided, one on the inside and the other on the outside of the cable duct.

Figure 7:
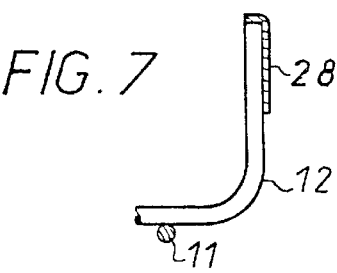
FIGS. 7 to 13 are views analogous to FIG. 6 and each corresponds to one variant thereof.
Figure 9:
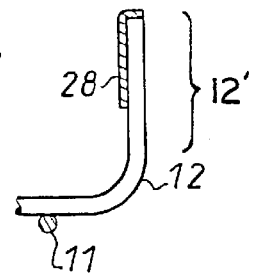

In FIG. 7 the section 28 has an L-shaped cross section and therefore incorporates a narrow longitudinal rim. The width of the rim is advantageously equal to the diameter of the transverse wire 12 so that the rim caps the free ends of the flange portions of the transverse wires 12, whether the section 28 is on the outside of the cable duct, as shown in FIG. 7, or on the inside, as shown in FIG. 9.

Figure 8:
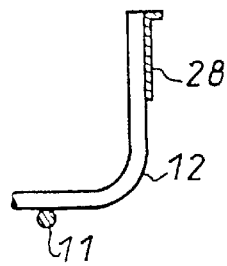

The section 28 can of course be disposed so that its rim is directed toward the outside of the cable duct, as shown in FIG. 8.

Figure 11:
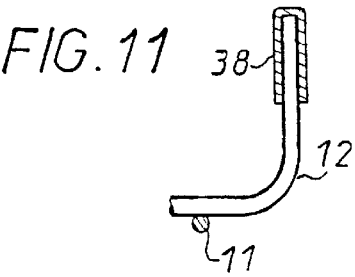

The section 38 shown in FIG. 11 has a U-shaped cross section with wide flanges and straddles the flange portions of the transverse wires 12. The inside dimension of the base of the U-shape of the section 38 is equal to the diameter of the transverse wires 12.

Figure 12:
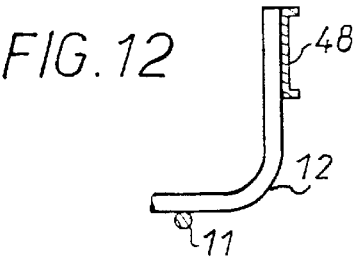

The section 48 shown in FIG. 12 has a U-shaped section with narrow flanges and is attached to the outside of the cable duct with the narrow flanges directed toward the outside.

Figure 13:
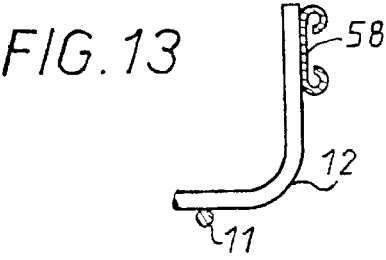

The section 58 shown in FIG. 13 is similar to the section 48 shown in FIG. 12 except that the flanges of the section 58 have a rolled edge extending toward the inside of the U-shape of the section.

Many trials have shown that the performance of a wire cable duct according to the invention, in terms of sag and loading, is improved by at least 15%, reflected in an increase in the maximum span between two consecutive supports.

What is claimed is:

1. A wire cable duct comprising a grid made up of wires of two different types, namely at least one longitudinal wire which runs longitudinally the entire length of the duct and U-shaped transverse wires disposed transversely to the longitudinal wires, from place to place along their length and appropriately attached thereto, the resulting trough-like combination forming three panels, namely a bottom panel and two side panels, which side panels comprise a longitudinal row of successive planar and substantially rectangular edge meshes which constitute upper parts of said side panels, each of which is defined between two facing flange portions of two consecutive transverse wires, and each of which includes at least one anti-flexing member adapted to limit flexing of said edge mesh about an axis perpendicular to a plane of said edge mesh, wherein each said edge mesh consists of two consecutive ones of the longitudinal wires joined to the facing flange portions of the two consecutive transverse wires and to each other by at least one wire crossmember that serves as said anti-flexing member, and wherein said crossmember is parallel to said flange portions of said transverse wires.

* * * * *